United States Patent
Sagawa et al.

(10) Patent No.: US 8,691,395 B2
(45) Date of Patent: Apr. 8, 2014

(54) COMPOSITE MATERIAL FOR BRAZING AND A BRAZED PRODUCT MANUFACTURED USING THE SAME

(75) Inventors: Hideyuki Sagawa, Naka (JP); Kazuma Kuroki, Hitachinaka (JP); Hiromitsu Kuroda, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 1266 days.

(21) Appl. No.: 12/357,014

(22) Filed: Jan. 21, 2009

(65) Prior Publication Data

US 2009/0186239 A1    Jul. 23, 2009

(30) Foreign Application Priority Data

Jan. 23, 2008  (JP) ................. 2008-012805
Dec. 9, 2008   (JP) ................. 2008-312790

(51) Int. Cl.
| | | |
|---|---|---|
| B32B 15/00 | (2006.01) | |
| B23K 1/00  | (2006.01) | |
| B32B 15/20 | (2006.01) | |
| C23C 28/02 | (2006.01) | |

(52) U.S. Cl.
USPC ........... 428/652; 428/650; 428/655; 428/656; 428/668; 428/671; 428/674; 428/676

(58) Field of Classification Search
None
See application file for complete search history.

(56) References Cited

U.S. PATENT DOCUMENTS

| | | | | |
|---|---|---|---|---|
| 4,157,154    | A  * | 6/1979  | Scott et al. ............. | 228/140 |
| 6,596,413    | B2 * | 7/2003  | Wittebrood et al. ..... | 428/652 |
| 2002/0066769 | A1 * | 6/2002  | Haynes et al. .......... | 228/117 |
| 2002/0102431 | A1 * | 8/2002  | Wittebrood et al. ..... | 428/658 |
| 2002/0155313 | A1 * | 10/2002 | Palmgren ............... | 428/621 |
| 2004/0035910 | A1 * | 2/2004  | Dockus et al. .......... | 228/56.3 |
| 2007/0108253 | A1 * | 5/2007  | Ozbaysal ............... | 228/56.3 |

FOREIGN PATENT DOCUMENTS

| | | |
|---|---|---|
| JP | 2003-145290 | 5/2003 |
| JP | 2004-291078 | 10/2004 |
| WO | 02-38326    | * 5/2002 |

* cited by examiner

*Primary Examiner* — Gwendolyn Blackwell
*Assistant Examiner* — Lucas Wang
(74) *Attorney, Agent, or Firm* — Brundidge & Stanger, P.C.

(57) ABSTRACT

A composite material for brazing having features of: forming a homogenous distribution of components in the brazing filler material even after brazing; having an excellent workability; offering low manufacturing costs; and having satisfactory corrosion resistivity as desired. The composite material for brazing has a lamination of a brazing filler material layer thereon, wherein the brazing filler material layer is a layer of alloy that includes copper, aluminum, and nickel.

12 Claims, 3 Drawing Sheets

COMPOSITE MATERIAL FOR BRAZING AND A BRAZED PRODUCT
MANUFACTURED USING THE SAME

TECHNICAL FIELD

The present invention relates to a composite material having brazing-compatibility and to a brazed product manufactured using the same. More particularly, the invention relates to such a composite material as provides high oxidation resistivity at the brazed portion and to a brazed product manufactured using the invented composite material for brazing.

BACKGROUND ART

A stainless steel-based composite material for brazing has been used as a bonding material in automotive oil coolers. In this material, copper as a brazing filler metal is clad on one side or both sides of a stainless steel plate.

Patent literature 1 has described a composite material for brazing and a brazing filler material having high corrosion resistivity and heat resistivity. These composite materials have such a structure that a nickel-chromium alloy, which includes 1 mass-percent to 30 mass-percent of chromium, is firstly laminated as a Fe-atom diffusion constraint layer on a base material consist of corrosion resistant steel, and then thereon copper brazing filler is laminated.

Patent Literature 1:
 Japanese Unexamined Patent Publication: JP 2003-145290
Patent Literature 2:
 Japanese Unexamined Patent Publication: JP 2004-291078

SUMMARY OF INVENTION

A stainless steel-based composite material for brazing which is used as a bonding material in automotive oil coolers has such a construction that copper, which is a brazing-compatible material, is cladded on one side or both sides of a stainless steel plate. When this composite material for brazing is applied in the oil cooler, the copper in that structure will cause no problems in terms of corrosion resistivity of the cooler in use. This composite material however will bring a serious problem in terms of corrosion resistivity and, especially, high-temperature oxidation when it is applied to products which is used in corrosive or high-temperature environment such as heat exchangers for fuel cells or in joiners for coolers for exhaust gas re-circulation (EGR) devices. A high-temperature and highly corrosive solution or exhaust gas, or both, circulates in the heat exchanger and the EGR cooler. Therefore, a conventional copper brazing filler is not suitable for such use as its inherent corrosion resistivity in the conventional copper brazing filler is not enough. The composite material described in patent literature 1 has improved properties at brazed portion in corrosion resistance and oxidation resistance, which are rendered by diffusion of nickel and chromium into the copper brazing filler from the nickel-chromium alloy layer provided underneath. The lamination structure of the brazing filler material in the composite material, however, causes such a problem that the copper brazing filler alone flows allowing its accumulation at the joining portion before nickel and chromium well diffuse from the nickel-chromium layer underneath when the brazing is performed at temperatures higher than the melting point of the copper brazing filler. A joining portion having a large volume of the brazing filler material accumulation must be supplied with nickel and chromium from the nickel-chromium layer underneath. This supply causes a local reduction of thickness of nickel-chromium layer at the joining portion, an inadequate diffusion (or supply) of nickel or chromium, or inhomogeneous distribution of components in the brazing filler material portion. Especially, the inhomogeneous distribution of nickel and chromium concentrations invites a serious performance problem since it causes locally lowered strength or a locally weakened corrosion resistivity An object of the present invention therefore is to provide a composite material for brazing that solves these problems. The intended composite material is to have features of: forming a homogenous distribution of components in the brazing filler material even after brazing; having an excellent workability; offering low costs for material and in manufacturing; and having satisfactory corrosion resistivity as desired. The object includes providing brazed products that use the intended composite material for brazing.

An investigation in various compositions of composite materials has led to the present invention of a composite material for brazing that has a specific composition of selected brazing filler materials.

The invented composite material includes a composite material for brazing having a brazing filler material layer laminated on a base material, wherein the brazing filler material layer is comprised of an alloy that includes copper, aluminum, and nickel.

The invented composite material further includes a composite material for brazing having a laminated layer of brazing filler material on a base material, wherein the layer of brazing filler material is a laminate formed by laminating copper or copper alloy, aluminum or aluminum alloy, and nickel or nickel alloy in this order from the base material side toward outer side.

Arranging nickel, not copper nor aluminum, as the outermost layer of the laminate structure prevents a flow of a single metal alone that would occur before the brazing filler material merges at the brazed joining portion while brazing. Arranging aluminum as the intermediate layer in the laminate suppresses forming brittle intermetallic compound between aluminum and ferrous base material.

Further, since the invented composite material has an integrated composite structure of the base material and the brazing filler material, the structure offers a good productivity (such as workability, easiness in fabrication, or handleability under such a state that the brazing filler material has been applied) when a product uses the invented composite material.

A preferred content rate of nickel to the entire amount of the brazing filler material layer is 2 weight-percent (wt %) or more but 10 wt % or less.

A preferred content ratio of aluminum to the entire amount of the brazing filler material layer is 2 wt % or more but 40 wt % or less.

A preferred material as the base material is stainless steel.

A product referred in this description means such product as is manufactured using the above-stated composite material for brazing where the context permits.

According to the present invention, it is practicable to provide a composite material for brazing having features of: forming a homogenous distribution of components in the brazing filler material even after brazing; having an excellent workability; offering low manufacturing costs; and having satisfactory corrosion resistivity as desired. It is also practicable to provide brazed products that use the above-stated composite material for brazing.

DESCRIPTION OF EMBODIMENTS

The following describes a preferred embodiment referring to drawings attached hereto.

Figure 1:
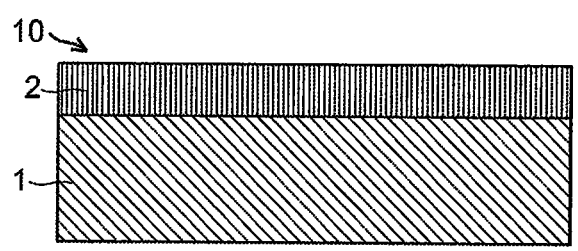
[FIG. 1] A sectional view of a composite material for brazing to show a preferred embodiment of the present invention

As shown in FIG. 1, the composite material for brazing 10 in a first embodiment of the present invention has such a structure that a brazing filler material layer 2 is laminated on a base material 1 comprised of austenitic stainless steel to form an integrated composite structure thereon, wherein the brazing filler material layer 2 is a layer of alloy that includes copper (Cu), aluminum (Al), and nickel (Ni).

The base material 1 is formed in a plate-shape, on one side of which the brazing filler material layer 2 is laminated.

The reason of why the embodiment uses Cu, Al, and Ni as the component of the layer of brazing filler material 2 is that they are comparatively easily available, and the alloys that include these materials is compatible with metal-works such as rolling, pressing, and drawing. It is also the reason that the brazing filler material layer 2 comprised of such materials shows an excellent corrosion resistivity when the layer is melted and merged through the heat treatment in the brazing process.

The reason for using stainless steel for the base material 1 is that stainless steel: shows acceptable corrosion resistivity even under the same condition that requires use of a brazing filler material having a high resistivity against corrosion; is available at a relatively low cost as it has broad utility; and has excellent workability for metal-works such as rolling, pressing, and drawing.

The content ratio of Ni (a quotient of weight of Ni divided by entire weight of the brazing filler material layer) to the entire amount of the brazing filler material layer was determined to be 2 wt % or more but 10 wt % or less. If the concentration of Ni is below 2 wt %, the corrosion resistivity particularly under a humid environmental condition is not enough. If in contrast the content is over 10 wt %, brazing does not succeed at a practical brazing temperature (about 1200° C.) commonly employed for a brazing filler material since such content rises melting point of a brazing filler material.

The content ratio of Al (a quotient of weight of aluminum divided by entire weight of the brazing filler material layer) to the entire amount of the brazing filler material layer was determined to be 2 wt % or more but 40 weight-% or less. If the concentration of aluminum is below 2 wt %, contribution to enhancing the high-temperature oxidation resistivity is small. If in contrast the content is over 40 wt %, the corrosion resistivity decreases.

As stated above, the composite material for brazing 10 has a lamination of the brazing filler material layer 2 thereon, wherein the brazing filler material layer 2 is a layer of alloy that includes Cu, Al, and Ni. Thereby, it becomes practicable to obtain the composite material for brazing 10 having features of: forming a homogenous distribution of components in the brazing filler material even after brazing; having an excellent workability; offering low manufacturing costs; and having satisfactory corrosion resistivity as desired.

In the composite material for brazing 10, the base material 1 and the brazing filler material layer 2 are integrated in a composite structure beforehand. Comparing to a powdered brazing filler material therefore, the composite material for brazing 10 is excellent in handleability and easiness of fabrication of devices such as heat exchangers permitting facile fabrication of brazed products.

Figure 2:
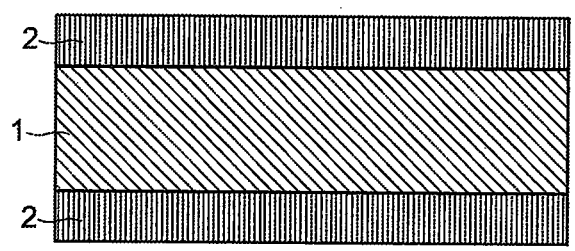
[FIG. 2] A sectional view of a composite material for brazing having a modified configuration

Above-stated features are explained based on the composite material for brazing 10, in which the brazing filler material layer 2 is laminated on one side of the base material 1. Embodiments however are not limited to such one-surface lamination structure. As shown in FIG. 2, such a structure that the brazing filler material layer 2 is laminated on both sides, or otherwise every surface including edges, of the base material 1 can be another embodiment of the present invention. It however should be noted that the side of the base material 1 includes every face thereof that exposed to outside.

Figure 3:
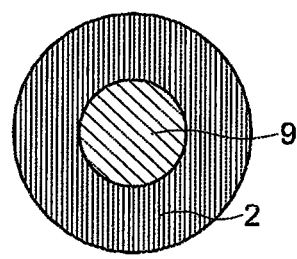
[FIG. 3] A sectional view of a composite material for brazing having a modified configuration

The description in this embodiment says that the base material 1 has a plate-shape. The shape in embodiments however is not limited to a plate-shape. For example, a base material 9 may be formed in a rod or wire as shown in FIG. 3, or otherwise, may be formed in a pipe. In these cases, the brazing filler material layer 2 is to be laminated on periphery of the base material 9.

The following explains a second embodiment of the present invention, wherein the brazing filler material layer 2 is modified. In this embodiment, the same reference numerals as in the first embodiment are employed for a base material 1 without explanation since its construction is the same as in the first embodiment.

Figure 4:
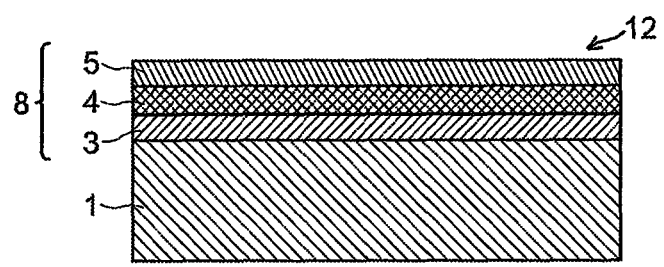
[FIG. 4] A sectional view of a composite material for brazing to show another preferred embodiment

As shown in FIG. 4, the composite material for brazing 12 in the second embodiment of the present invention has such a structure that a brazing filler material layer 8 is laminated on a base material 1. The brazing filler material layer 8 is comprised of a first layer 3 composed of Cu or Cu alloy, a second layer 4 composed of Al or Al alloy, and a third layer 5 composed of Ni or Ni alloy. These layers are laminated on the base material 1 in this order from the surface thereof toward outer side forming an integrated composite structure of the brazing filler material layer 8 thereon.

The reason of why the embodiment uses Cu or Cu alloy, Al or Al alloy, and Ni or Ni alloy as the component of the brazing filler material is that they are comparatively easily available in a form of plate or foil as general-purpose materials, and that these materials are compatible with metal-works such as rolling, pressing, and drawing. It is also the reason that the brazing filler material layer 8 comprised of such materials shows an excellent corrosion resistivity when the layer is melted and merged through the heat treatment in the brazing process.

The content ratio of Ni (a quotient of weight of Ni divided by entire weight of the brazing filler material layer) to the entire amount of the brazing filler material layer 8 was determined to be 2 wt % or more but 10 wt % or less from the same reason as detailed in the description of the first embodiment.

The content ratio of Al (a quotient of weight of Al divided by entire weight of the brazing filler material layer) to the entire amount of the brazing filler material layer 8 was determined to be 2 wt % or more but 40 wt % or less from the same reason as detailed in the description of the first embodiment.

Cu alloys such as Cu—P, Cu—Ni, Cu—Cr, and Cu—Ti are usable in the first layer 3. Al alloys such as Al—Cu, Al—Mn, Al—Si, Al—Mg, Al—Zn, and Al—Ni are usable in the second layer 4. Ni alloys such as Ni—Cr, Ni—Fe, and Ni—Cu are usable in the third layer 5. Any combination of these alloys also gives the same effect.

As stated above, the composite material for brazing 12 has a lamination of the brazing filler material layer 8 thereon. The brazing filler material layer 8 is a laminated layer of: Cu or Cu alloy, Al or Al alloy, and Ni or Ni alloy, which are laminated on the base material 1 in this order from the surface thereof toward outer side forming an integrated composite structure. Thereby, it becomes practicable to obtain the composite material for brazing 12 having features of: forming a homogenous distribution of components in the brazing filler material even after brazing; having an excellent workability; offering low manufacturing cost; and having satisfactory corrosion resistivity as desired.

In the composite material for brazing 12, the base material 1 and the brazing filler material layer 8 are integrated in a composite structure beforehand. Comparing to a powdered brazing filler material therefore, the composite material for brazing 12 is excellent in handleability and easiness of fabrication of devices such as heat exchangers permitting facile fabrication of brazed products.

Figure 5:
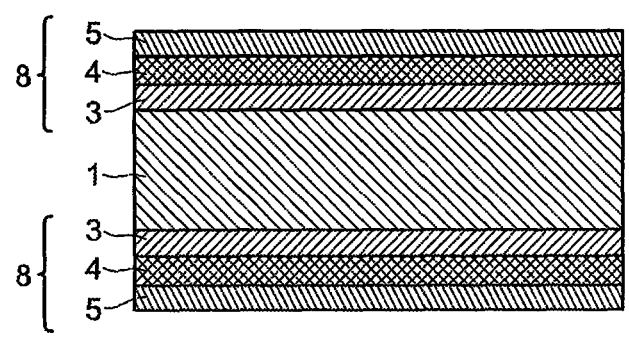
[FIG. 5] A sectional view of a composite material for brazing having a modified configuration of the composite material for brazing shown in FIG. 4

Above-stated features are explained based on the composite material for brazing 12, in which the brazing filler material layer 8 is laminated on one side of the base material 1. Embodiments however are not limited to such one-surface lamination structure. As shown in FIG. 5, such a structure that the brazing filler material layer 8 is laminated on both sides, or otherwise every surface including edges, of the base material 1 can be another embodiment of the present invention.

Figure 6:
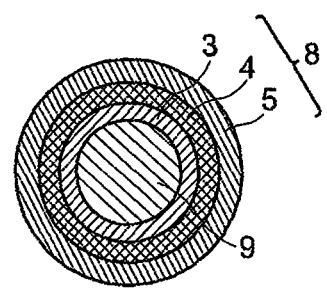
[FIG. 6] A sectional view of a composite material for brazing having a modified configuration of the composite material for brazing shown in FIG. 4

The description in this embodiment says that the base material 1 has a plate-shape. The shape in embodiments is not limited to a plate-shape. For example, a base material 9 may be formed in a rod or wire as shown in FIG. 6, or otherwise, may be formed in a pipe. In these cases, the brazing filler material layer 8, which is composed of the first layer 3, the second layer 4, and the third layer 5, is to be laminated on periphery of the base material 9.

The use of the composite materials for brazing 10 and 12 is not limited to parts for heat exchangers or fuel cells. The composite materials for brazing 10 and 12 are widely applicable to any joining purpose where a high corrosion resistivity is required.

(Embodiment 1)

A composite material for brazing was prepared by cladding a Ni—Al—Cu alloy strip (0.2 mm thick.) comprised of Cu with 5 wt % of Ni and 8 wt % of Al on a stainless steel strip of SUS 304 with a rolling process. The rolling process was applied repeatedly until the overall thickness of the Ni—Al—Cu alloy clad layer reached 50 μm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Embodiment 2)

A composite material for brazing was prepared by cladding a Cu strip (2.5 mm thick.), an Al strip (0.4 mm thick.), and a Ni strip (0.06 mm thick.) on a stainless steel strip of SUS 304 in this order from the surface thereof toward outer side, with a rolling process. The rolling process was applied repeatedly until the overall thickness of Cu—Al—Ni clad layer reached 50 μm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Embodiment 3)

A composite material for brazing was prepared by cladding a Cu strip (1.0 mm thick.), an Al strip (1.6 mm thick.), and a Ni strip (0.16 mm thick.) on a stainless steel strip of SUS 304 in this order from the surface thereof toward outer side, with a rolling process. The rolling process was applied repeatedly until the overall thickness of Cu—Al—Ni clad layer reached 50 μm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Embodiment 4)

A composite material for brazing was prepared by cladding a Cu strip (2.5 mm thick.), an Al strip (0.2 mm thick.), and a Ni strip (0.14 mm thick.) on a stainless steel strip of SUS 304 in this order from the surface thereof toward outer side, with a rolling process. The rolling process was applied repeatedly until the overall thickness of Cu—Al—Ni clad layer reached 50 μm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Embodiment 5)

A composite material for brazing was prepared by cladding a Cu strip (1.0 mm thick.), an Al strip (2.4 mm thick.), and a Ni strip (0.1 mm thick.) on a stainless steel strip of SUS 304 in this order from the surface thereof toward outer side, with a rolling process. The rolling process was applied repeatedly until the overall thickness of Cu—Al—Ni clad layer reached 50 μm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 1)

A composite material for brazing was prepared by cladding a Cu strip (2.5 mm thick.), an Al strip (0.4 mm thick.), and a Ni strip (0.04 mm thick.) on a stainless steel strip of SUS 304 in this order from the surface thereof toward outer side, with a rolling process. The rolling process was applied repeatedly until the overall thickness of Cu—Al—Ni clad layer reached 50 μm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 2)

A composite material for brazing was prepared by cladding a Cu strip (1.5 mm thick.), an Al strip (0.3 mm thick.), and a Ni strip (0.19 mm thick.) on a stainless steel strip of SUS 304 in this order from the surface thereof toward outer side, with a rolling process. The rolling process was applied repeatedly until the overall thickness of Cu—Al—Ni clad layer reached 50 μm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 3)

A composite material for brazing was prepared by cladding a Cu strip (2.5 mm thick.), an Al strip (0.1 mm thick.), and a Ni strip (0.14 mm thick.) on a stainless steel strip of SUS 304 in this order from the surface thereof toward outer side, with a rolling process. The rolling process was applied repeatedly until the overall thickness of Cu—Al—Ni clad layer reached 50 µm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 4)

A composite material for brazing was prepared by cladding a Cu strip (1.0 mm thick.), an Al strip (2.5 mm thick.), and a Ni strip (0.1 mm thick.) on a stainless steel strip of SUS 304 in this order from the surface thereof toward outer side, with a rolling process. The rolling process was applied repeatedly until the overall thickness of Cu—Al—Ni clad layer reached 50 µm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 5)

A composite material for brazing was prepared by cladding a Ni—Cr alloy strip (0.3 mm thick.), and a Cu strip (0.3 mm thick.) on a stainless steel strip of SUS 304 in this order from the surface thereof toward outer side, with a rolling process. The rolling process was applied repeatedly until the overall thickness of Ni/Cr—Cu clad layer reached 50 µm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 6)

A composite material for brazing was prepared by cladding a Ni strip (0.06 mm thick.), a Cu strip (2.5 mm thick.), and an Al strip (0.4 mm thick.) on a stainless steel strip of SUS 304 in this order from the surface thereof toward outer side, with a rolling process. The rolling process was applied repeatedly until the overall thickness of Ni—Cu—Al clad layer reached 50 µm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 7)

A composite material for brazing was prepared by cladding a Cu strip (2.5 mm thick.), a Ni strip (0.06 mm thick.), and an Al strip (0.4 mm thick.) on a stainless steel strip of SUS 304 in this order from the surface thereof toward outer side, with a rolling process. The rolling process was applied repeatedly until the overall thickness of Cu—Ni—Al clad layer reached 50 µm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 8)

A composite material for brazing was prepared by cladding an Al strip (0.4 mm thick.), a Ni strip (0.06 mm thick.), and a Cu strip (2.5 mm thick.) on a stainless steel strip of SUS 304 in this order from the surface thereof toward outer side, with a rolling process. The rolling process was applied repeatedly until the overall thickness of Al—Ni—Cu clad layer reached 50 µm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 9)

A composite material for brazing was prepared by cladding a Ni strip (0.06 mm thick.), an Al strip (0.4 mm thick.), and a Cu strip (2.5 mm thick.) on a stainless steel strip of SUS 304 in this order from the surface thereof toward outer side, with a rolling process. The rolling process was applied repeatedly until the overall thickness of Ni—Al—Cu clad layer reached 50 µm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Comparison Example 10)

A composite material for brazing was prepared by cladding an Al strip (0.4 mm thick.), a Cu strip (2.5 mm thick.), and a Ni strip (0.06 mm thick.) on a stainless steel strip of SUS 304 in this order from the surface thereof toward outer side, with a rolling process. The rolling process was applied repeatedly until the overall thickness of Al—Cu—Ni clad layer reached 50 µm. The composite material for brazing thus prepared was put in a tubular furnace. Then the material was pre-heated at 500° C. in a vacuum atmosphere followed by heating at 1200° C. with the vacuum retained. After being heated, the material was evaluated for its brazing properties.

(Example by Conventional Practice 1)

A two-layer structure composite material for brazing was prepared by cladding a Cu strip on a stainless steel strip of SUS 304 with a rolling process. The rolling process was applied until the thickness of the Cu layer reached 50 µm. The two-layer structured composite material for brazing thus prepared was put in a tubular furnace. Then the material was heated at 1120° C. to have the brazing filler material layer melt. After this heat treatment, the material was evaluated for its brazing properties.

Table 1 given below indicates results of evaluation made on those composite materials for brazing in the embodiments, comparison examples, and an example by conventional practice for their properties. The examined properties in the evaluation are: corrosion test (corroded or not corroded in wet environment and at high-temperatures), dispersion of composition of the brazing filler material after brazing, and molten-flow of brazing filler material. Measured properties for these items were placed under an overall evaluation.

TABLE 1

| Specimens | | Configuration of Composite material for Brazing (From outer side to inner) | Ni-concentration at Brazing Filler Material Portion (wt %) | Al-concentration at Brazing Filler Material Portion (wt %) | Corrosion Test (Corroded/Not corroded) Wet Environment | Corrosion Test (Corroded/Not corroded) High Temperature | Dispersion of Composition after Brazing | Molten-flow of Brazing Filler Material | Overall Evaluation |
|---|---|---|---|---|---|---|---|---|---|
| Embodiment | 1 | Ni—Al—Cu/SUS304 | 5 | 8 | ○ | ○ | ○ | ○ | ○ |
| | 2 | Ni/Al/Cu/SUS304 | 2 | 5 | ○ | ○ | ○ | ○ | ○ |
| | 3 | Ni/Al/Cu/SUS304 | 10 | 30 | ○ | ○ | ○ | ○ | ○ |
| | 4 | Ni/Al/Cu/SUS304 | 5 | 2 | ○ | ○ | ○ | ○ | ○ |
| | 5 | Ni/Al/Cu/SUS304 | 5 | 40 | ○ | ○ | ○ | ○ | ○ |
| Comparison Example | 1 | Ni/Al/Cu/SUS304 | 1 | 5 | X | ○ | ○ | ○ | X |
| | 2 | Ni/Al/Cu/SUS304 | 11 | 5 | ○ | ○ | Δ | X | X |
| | 3 | Ni/Al/Cu/SUS304 | 5 | 1 | ○ | Δ | ○ | ○ | Δ |
| | 4 | Ni/Al/Cu/SUS304 | 5 | 41 | X | ○ | ○ | ○ | X |
| | 5 | Cu/Ni—Cr/SUS304 | (Not applicable) | (Not applicable) | Δ | Δ | X | ○ | X |
| | 6 | Al/Cu/Ni/SUS304 | 2 | 5 | Δ | ○ | Δ | Δ | Δ |
| | 7 | Al/Cu/Ni/SUS304 | 2 | 5 | Δ | ○ | Δ | Δ | Δ |
| | 8 | Cu/Al/Ni/SUS304 | 2 | 5 | Δ | ○ | Δ | Δ | Δ |
| | 9 | Cu/Ni/Al/SUS304 | 2 | 5 | ○ | Δ | Δ | Δ | Δ |
| | 10 | Ni/Cu/Al/SUS304 | 2 | 5 | ○ | Δ | Δ | Δ | Δ |
| Example by Conventional Practice | 1 | Cu/SUS304 | (Not applicable) | (Not applicable) | Δ | X | ○ | ○ | X |

Remark:
The meaning of marks ○, Δ, and X are defined in the descriptions below.

The corrosion test in a wet environment for examination of wet corrosion resistivity is conducted in such a manner that: the specimen was immersed in a corrosive solution for 1000 hours, which contains 200 ppm of chloride ion, 80 ppm of nitrate ion, and 1000 ppm of sulfate ion; and then the specimen was taken out form the solution to be put under observation of brazed portion. The observation precisely examined if the brazed portion in the specimen is corroded or not. The specimen was further examined for the degree of corrosion by quantitative analysis of the immersion-used corrosive aqueous solution for substances eluted therein. The specimen was prepared brazing a stainless steel pipe on a base material having brazing filler material thereon, forming a fillet between the pipe and the base. The stainless steel pipe was 6 mm in diameter and the base was 25 mm by 25 mm in dimensions. In the test, the degree of corrosion was rated based on the maximum corrosion attack depth determined by observing the condition of cross section of the brazed portion comparing the specimen before and after the immersion. The rating for corrosion attack was indicated with marks: ○ where the maximum corrosion attack depths was below 20 μm; Δ where 20 μm or over but below 100 μm; and × where 100 μm and over. The quantitative rating for eluted substance in the corrosive aqueous solution due to corrosion was indicated with marks: ○ where the individual amounts for every element in the solution eluted from the element included in the brazing filler material was below 0.5 mg/L; Δ where 0.5 mg/L or more but below 1 mg/L; and × where 1 mg/L or over. This rating on the eluted substance amount agreed with the rating on the corrosion attack maximum depth. Then, the overall judgment over these two properties was taken as the evaluation result of the corrosion test in wet environment.

The corrosion test at a high temperature for examination of high temperature corrosion resistivity was conducted in such a manner that: the brazed specimen was exposed to 600° C. in open air atmosphere for 50 hours and then the surface thereof was analyzed with scanning electron microscope-electrodiagnosis (SEM-EDX) and Auger analysis (depth profile) for rating degree of oxidation. The specimen was prepared melting the brazing filler materials directly on a base material having a size of 25 mm by 25 mm. In the test, the degree of oxidation was rated based on the measurement of oxide layer thickness observing cross section of the brazed portion after the exposure to a high-temperature. The rating for oxide layer thickness was indicated with marks: ○ where the oxide layer thickness was below 2 μm; Δ where 2 μm or more but below 5 μm; and × where 5 μm and over.

Figure 7:
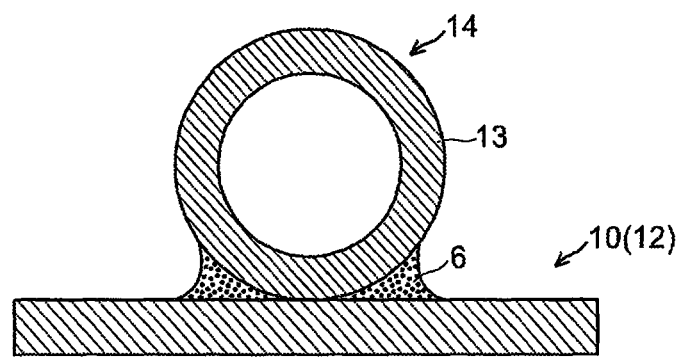
[FIG. 7] A schematic sectional view of a specimen prepared for the evaluation of brazing properties
Figure 8:
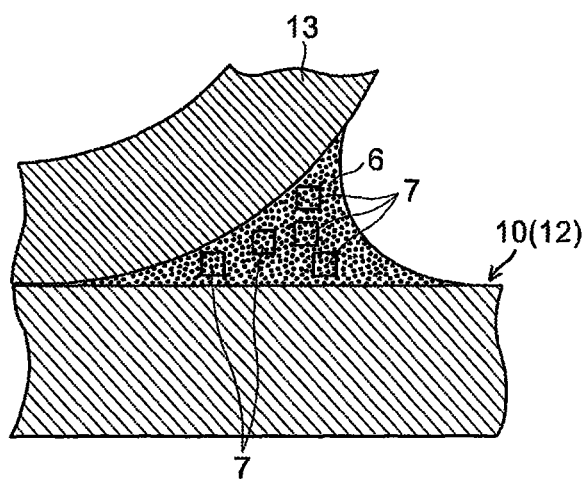
[FIG. 8] An enlarged schematic sectional view of a specimen prepared for the evaluation of brazing properties

The examination of the dispersion of composition after brazing was made on a brazed specimen 14, which was prepared brazing a stainless steel pipe 13 on a composite material for brazing 10 or 12 as shown in FIGS. 7 and 8. EDX analysis was conducted at five different points 7 in the cross section of a fillet 6 built up on the brazed portion in the brazed specimen 14. Analysis values with EDX on the five points were compared each with the other. Where the comparison revealed concentration of Ni, Al, or Cr at some locations has differed from the other's by more than 3 wt % with a dependency on the location even within the fillet 6 in one brazed portion, the examined specimen was rated as has had a dispersion. The rating for the degree of dispersion was indicated with marks: ○ where the difference of concentration of Ni, Al, or Cr from the other's regardless of its location but within the fillet 6 in one brazed portion was below 1 wt %; Δ where 1 wt % or more but below 3 wt %; and × where 3 wt % and over.

The molten-flow property of the brazing filler material is rated according to the measurement of the cross-sectional area of the fillet 6 of the brazed portion formed by brazing a stainless steel pipe. The rating for the molten-flow property was indicated with marks: ○ where the area of the fillet was 70% to 100% of that of the fillet 6 in the brazed portion formed by Cu brazing filler material in example by conventional practice 1; and × where 70% or less.

As shown in Table 1, embodiments 1 to 5, in which the concentrations of both Ni and Al in the brazing filler material were 2 wt % or more, showed good corrosion resistivity in wet environment and at high-temperature among specimens having same component in the brazing filler material; further, the specimens showed very small dispersion of composition after brazing. Thereby, enough corrosion resistivity and bonding strength were attained at the brazed portion. The molten-flow property was also excellent. In contrast, comparison example 1, of which Ni-concentration was below 2 wt %, and comparison example 4, of which Al-concentration was over 40 wt %, were not acceptable in corrosion resistivity in the wet environment. Comparison example 2, of which Ni-concentration was over 10 wt %, showed very poor molten-flow property due to a rise in melting point. Comparison example 4, of which Al-concentration was over 40 wt %, was not acceptable in performance in corrosion test in wet environment, as comparison example 1 was so.

Comparison example 5, which has a Cu-surface and an inner layer of Ni—Cr alloy, showed a broad dispersion of composition after brazing. The corrosion test revealed that this broad dispersion would develop into a local corrosion. This worsening development, when Cu exists on a surface, is attributable to such Cu. Because, the Cu on the surface alone melts to flow into the joining portion before both Cu and Ni—Cr alloy reach a well-diffused and homogeneously merged state.

Comparison examples 6 to 9 have the same components in their brazing filler material layers as embodiment 2 has. The outermost surfaces of them however are Al or Cu, of which melting point is low. Therefore, the molten surface-material alone can flow into the joining portion before all the components in the brazing filler material in the three-layer structure reach a well-diffused and homogeneously merged state. Because of this, the components in the brazing filler material spread with some dispersion of composition after brazing. The corrosion test revealed that this caused weak corrosion resistivity in wet environment or at high temperatures.

Comparison examples 6 and 7 use Al as the outermost surface material thereof, wherein Al is such a material as forms stable oxides most easily among components in the brazing filler materials under this examination. These comparison examples showed very poor molten-flow property when brazing was performed in an Oxygen-rich atmosphere, such as in open air.

Comparison example 10 has Al, a low melting point material, at the innermost location in the brazing filler material layer. This comparison example showed degraded molten-flow property because of inadequate progress of lowering melting points of Cu and Ni existing near the outermost surface to which the existence of Al at innermost location in the brazing filler material layer is responsible.

From these, it is deduced that, when the brazing filler material layer 2 is intended to be provided on the base material 1 in a lamination structure, the outermost surface of the lamination should use Ni or Ni alloy, which has a high melting point, and that the Ni-concentration in the brazing filler material should be preferably 2 wt % to 10 wt % and Al-concentration preferably 2 wt % to 40 wt %, like embodiments 2 to 5. This configuration of materials provides a brazing filler material that would form homogeneous composition at the joining portion; because Ni, of which melting point is higher than Cu and Al, or Ni alloy otherwise, is placed on the outermost surface, thereby Ni or Ni alloy well merges with Cu and Al before the brazing filler material begins to flow into the joining portion.

The brazing filler material in example by conventional practice 1 is a single metal, which accordingly causes no problems in dispersion of composition connecting to a good brazing property. The example however revealed that such composition was not durable for use in a highly corrosive environment since its corrosion resistivity was not enough.

It will be obvious to those having skill in the art that many changes may be made in the above-described details of the preferred embodiments of the present invention. Composite material for brazing described in this invention could be prepared also by coating or by plating. The scope of the invention, therefore, should be determined by the following claims.

The invention claimed is:

1. A composite material for brazing comprising:
   a base material; and
   a brazing filler material layer laminated on the base material, said brazing filler material layer being a laminate comprising copper or copper alloy, aluminum or aluminum alloy, and nickel or nickel alloy, in this order from said base material towards outside,
   wherein a content ratio of nickel to the entire amount of said brazing filler material layer is greater than or equal to 2 weight-percent but less than or equal to 10 weight-percent, and
   wherein a content ratio of aluminum to the entire amount of said brazing filler material layer is greater than or equal to 2 weight-percent but less than or equal to 40 weight-percent.

2. The composite material for brazing according to claim 1, wherein said base material is a stainless steel.

3. The brazed product manufactured using said composite material for brazing according to claim 1.

4. The brazed product manufactured using said composite material for brazing according to claim 2.

5. A composite material for brazing comprising:
   a base material; and
   a brazing filler material layer laminated on the base material,
   wherein said brazing filler material layer is a laminate comprising copper or copper alloy, aluminum or aluminum alloy, and nickel or nickel alloy, in this order from said base material towards outside,
   where said copper or copper alloy is laminated on top of said base material, said nickel or nickel alloy is laminated outermost of said filler material layer, and said aluminum or aluminum alloy is laminated between said copper or copper alloy and said nickel or nickel alloy,
   wherein a content ratio of nickel to the entire amount of said brazing filler material layer is greater than or equal to 2 weight-percent but less than or equal to 10 weight-percent, and
   wherein a content ratio of aluminum to the entire amount of said brazing filler material layer is greater than or equal to 2 weight-percent but less than or equal to 40 weight-percent.

6. The composite material for brazing according to claim 5, wherein said content ratio of nickel to the entire amount of said brazing filler material layer is less than said content ratio of aluminum to the entire amount of said brazing filler material layer.

7. The composite material for brazing according to claim 5, wherein said content ratio of nickel to the entire amount of said brazing filler material layer is more than said content ratio of aluminum to the entire amount of said brazing filler material.

8. A composite material for brazing comprising:
   a base material; and
   a brazing filler material layer laminated on said base material,
   wherein said brazing filler material layer is a laminate comprising copper or copper alloy, aluminum or aluminum alloy, and nickel or nickel alloy, in this order from said base material towards outside, wherein said copper or copper alloy is laminated on top of said base material, said nickel or nickel alloy is laminated outermost of said filler material layer, said aluminum or aluminum alloy is laminated between said copper or copper alloy and said nickel or nickel alloy, wherein a content ratio of aluminum to the entire amount of said brazing filler material layer is greater than or equal to 2 weight-percent but less than or equal to 40 weight-percent, and wherein said content ratio of nickel to the entire amount of said brazing filler material layer is less than said content ratio of said aluminum to the entire amount of said brazing filler material layer.

9. A composite material for brazing comprising:

a base material; and a brazing filler material layer laminated on said base material, wherein said brazing filler material layer is a laminate comprising copper or copper alloy, aluminum or aluminum alloy, and nickel or nickel alloy, in this order from said base material towards outside, wherein said copper or copper alloy is laminated on top of said base material, said nickel or nickel alloy is laminated outermost of said filler material layer, and said aluminum or aluminum alloy is laminated between said copper or copper alloy and said nickel or nickel alloy, wherein a content ratio of aluminum to the entire amount of said brazing filler material layer is greater than or equal to 2 weight-percent but less than or equal to 40 weight-percent, and wherein said content ratio of nickel to the entire amount of said brazing filler material layer is greater than said content ratio of said aluminum to the entire amount of said brazing filler material layer.

10. The composite material for brazing according to claim 9, wherein said brazing filler material layer is laminated on top of one side of said base material.

11. The composite material for brazing according to claim 9, wherein said brazing filler material layer is laminated on top of both sides of said base material.

12. The composite material for brazing according to claim 9, wherein said base material is stainless steel.

\* \* \* \* \*